United States Patent [19]

Cap

[11] Patent Number: 4,622,510
[45] Date of Patent: Nov. 11, 1986

[54] PARAMETRIC ELECTRIC MACHINE

[76] Inventor: Ferdinand Cap, Karl-Innerebner-Strasse 40, A-6020 Innsbruck, Austria

[21] Appl. No.: 514,816
[22] PCT Filed: Jun. 7, 1982
[86] PCT No.: PCT/AT82/00018
§ 371 Date: Jun. 24, 1983
§ 102(e) Date: Jun. 24, 1983
[87] PCT Pub. No.: WO83/01713
PCT Pub. Date: May 11, 1983

[30] Foreign Application Priority Data

Oct. 29, 1981 [AT] Austria .................. 4603/81

[51] Int. Cl.$^4$ .............................................. H02N 1/08
[52] U.S. Cl. ................................. 320/1; 322/2 A; 330/4.5; 330/7
[58] Field of Search ........... 330/4.5, 7, 127; 320/1; 322/2 R, 2 A; 361/287; 307/428

[56] References Cited

U.S. PATENT DOCUMENTS 2,540,327  2/1951  Felici ................. 322/2 A X
3,094,653  6/1963  Le May et al. .......... 322/2 A
4,054,826  10/1977  Wahlstrom ............. 322/2 A X
4,096,393  6/1978  Sher ................... 322/2 A X

FOREIGN PATENT DOCUMENTS 633259  7/1936  Fed. Rep. of Germany.

OTHER PUBLICATIONS

Light Metals, London, (GB) Nov. 1946, "Aluminium and Magnesium in the Electrical Industries" pp. 611–613.

Primary Examiner—R. J. Hickey
Attorney, Agent, or Firm—Kurt Kelman

[57] ABSTRACT

A parametric electric machine consists of a series resonant circuit, which has a capacitance (C) which is adapted to be mechanically varied, an inductance (L) and a resistance (R). The no-load values of the capacitance ($C_o$), inductance ($L_o$) and resistance ($R_o$) fulfill the threshold condition $$\frac{\Delta C}{C_o} \cong 2 R_o \sqrt{\frac{C_o}{L_o}}$$

and at least one of the parameters L, R and C of the resonant circuit is a function of the current flowing in the resonant circuit.

7 Claims, 6 Drawing Figures

PARAMETRIC ELECTRIC MACHINE

This invention relates to a parametric electric machine comprising at least one capacitor having a capacity which is variable as a function of time and connected in series with an inductor, which comprises at least one induction coil, and a resistor.

STATE OF THE ART

It has already been proposed to convert mechanical energy to electrical energy by a periodic change of the electric parameters of a resonant circuit. In one such "parametric generator", a series resonant circuit comprises a capacitor and an induction coil and the capacitance is periodically varied. As the capacitance of the capacitor is reduced, its charge is condensed into a smaller space, to obtain a smaller capacitance. Work must be performed for this purpose. In that case the energy source is the mechanism which decreases the capacitance. For an increase of the capacitance it is not necessary to supply energy to the system because the charges having like signs repel each other and automatically occupy a larger space on the increased capacitance. For this reason, a periodic decrease and increase of the capacitance involves only a flow of energy from the drive mechanism into the resonant circuit (conversion of mechanical energy to electromagnetic energy).

A parametric generator can be expected to afford some advantages over conventional generators, the operation of which is based on induction and which either comprise permanent magnets (such as a bicycle dynamo) or generate the required magnetic field by exciting coils having windings which generate heat by the Joule effect. The resulting losses are so high that a direct water cooling is necessary in generators above a certain power. Considerable losses due to a generation of heat may arise also in the rotor windings. On the other hand, the parametric generator is free from losses which are due to a generation of heat and the generator can be used for a direct generation of relatively high voltages (in the kilovolt range). Additional advantages are the simple structure and the light weight of a parametric generator.

But the previous attempts to build a parametric generator have failed. It has not been possible to generate a periodic alternating current which is not dependent on the changing loads presented by the consumers but there have been exponentially increasing currents, which caused the induction coils to burn out, or the alternating current oscillation was quickly damped. It was also not possible to generate sinusoidal alternating current oscillations with a parametric generator. The reason for this fact becomes apparent upon a consideration of the differential equation for the parametric resonant circuit having a capacitance which varies as a function of time:

$$\frac{d^2 Q}{dt^2} + \frac{R_o}{L_o}\frac{dQ}{dt} + \frac{1}{L_o C_o}\left(1 - \frac{\Delta C}{C_o}\cos\omega t\right) Q = 0 \quad (I)$$

wherein $L_o$ is the inductance, which is assumed to be constant (at first instance) and $C_o$ is the mean total capacitance defined by $C_o = (C_{max} + C_{min})/2$, wherein $C_{max}$ is the highest and $C_{min}$ the lowest capacitance. The capacitance change is expressed as $\Delta C = (C_{max} - C_{min})/2$. $R_o$ is the resistance of the inductor and is constant (in the first instance) and $Q(t)$ is the charge on the capacitor.

The differential equation (I) is a damped Mathieu's differential equation, which generally has unstable solutions. This means that the voltage, charge and current exhibit an exponential approach to infinity or zero. A stable periodic oscillation is obtained only at certain values of the parameters $R_o$, $L_o$, $C_o$ and $\Delta C$ but that oscillation varies as a Mathieu function rather than as a sine function of time. And there is hardly a power supply system which will accept voltages varying as a Mathieu function of time.

To eliminate that disadvantage, it has been proposed in German Patent Specification No. 633,259 to apply a sinusoidal alternating current voltage to a parametric resonant circuit having a variable capacitance or inductance and to force that circuit to increase that separate excitation by parametric effects ("power amplifier").

SUMMARY OF THE INVENTION

It is an object of the invention to provide a parametric electric machine, i.e. a generator or a motor which is adapted to produce stable sinusoidal alternating currents without a separate excitation and which can be used to convert electric power to mechanical power when it is connected to a power supply system which supplies a sinusoidal alternating current.

This is accomplished according to the invention in that the resonant circuit of the machine fulfills the condition $$\frac{\Delta C}{C_o} \geq 2 R_o \sqrt{\frac{C_o}{L_o}}$$

wherein $C_o$ is the total basic capacitance of the capacitor (or capacitors), $\Delta C$ is the mechanically effected change of the (total) capacitance of the capacitor (or capacitors), $L_o$ is the (total) inductance of the induction coil(s), and $R_o$ is the (total) resistance of the induction coil(s), and of any additional strict resistances under no load, and at least one parameter (L, R, C) of the resonant circuit is a function of the current I flowing in the resonant circuit.

Just as in the above-mentioned equation (I), $C_o$ and $\Delta C$ have the following relation to the highest value of the (total) capacitance $C_{max}$ and to the lowest value of the (total) capacitance $C_{min}$ of the capacitor (capacitors):

$$C_o = \frac{C_{max} + C_{min}}{2}$$

$$\Delta C = \frac{C_{max} - C_{min}}{2}$$

In the simplest case the "capacitance" of the resonant circuit consists of a single capacitor having a variable capacitance and the "inductor" consists of a single induction coil having a core of ferromagnetic material. Alternatively, the "capacitance" may consist of a plurality of capacitors, at least one of which has a capacitance which varies as a function of time and which are connected in parallel or in series, and the "inductor" may consist of a plurality of induction coils which are connected in parallel or in series (and at least one of which has a stationary core of ferromagnetic material).

The invention is based on the recognition that the differential equation (I) can be transformed to an equation of oscillation which has solutions consisting of sine functions if the equation of oscillation has a nonlinear term. The invention is also based on the recognition that such nonlinear term of the equation of oscillation can be embodied in that at least one parametric component (L, R, C) of the resonant circuit is a function of the current $I = Q' = (do/dt)$ flowing in the resonant circuit. If it is assumed, for instance, that the inductor complies with the relation $$L = L_o(1 + g(Q'))$$

the parametric resonant circuit will have the following homogeneous nonlinear equation of oscillation:

$$\frac{d^2Q}{dt^2} + \frac{\frac{R_o}{L_o}\frac{dQ}{dt} + \frac{Q}{L_oC_o}\left(1 - \frac{\Delta C}{C_o}\right)\cos\omega t}{1 + g(Q') + Q'g'(Q')} = 0, \quad Q' = \frac{dQ}{dt} = I \quad \text{(II)}$$

If $g(Q')$ is properly selected, the differential equation (II) has a stable sinusoidal solution (after some periodic nonsinusoidal transients), provided that the threshold condition $$\frac{\Delta C}{C_o} \geq 2 R_o \sqrt{\frac{C_o}{L_o}}$$

is fulfilled as well as one of the resonance conditions which are possible. One of them reads:

$$\omega = 2 \frac{1}{\sqrt{L_oC_o}} \pm \sqrt{\frac{1}{L_oC_o}\left(\frac{\Delta C}{2C_o}\right)^2 - \frac{R_o^2}{L_o^2}}$$

Although the threshold condition includes the terms $C_o$, $R_o$, $L_o$ which correspond to the parameters of the resonant circuit under no load, it will be applicable as an inequation also under load.

In the generator, the compliance with the threshold condition means that the mechanical energy supplied to the generator is as least as large as the losses which occur in the resistors. In the motor, the compliance with the threshold condition means that the electrical energy which is supplied is at least as large as the losses in the resistors.

The feature according to the invention which resides in that at least one parameter (L, R, C) is a function of the current flowing in the resonant circuit (so that the equation of oscillation is nonlinear and has sinusoidal solutions) means that the resonant circuit of the machine must include an induction coil and/or a resistor and/or a capacitor which has an inductance or resistance or capacitance, respectively, which varies as a function of current. This concept can be embodied in various ways.

In one embodiment of the invention, at least one induction coil of the inductor of the resonant circuit has a stationary core of magnetic material. To minimize the losses which are due to the core of ferromagnetic material, the core of the induction coil must consist of a low-loss ferromagnetic material, i.e., of a material having a hysteresis loop which encloses an area which is as small as possible. The core losses should desirably be of an order of 1 to 3 W/kg (core loss $v_{10}$ at 50 Hz and 1 T = 10 kG maximum reduction). Besides, the hysteresis curve shall be as steep as possible so that the dependence ($\Delta L/\Delta I$) is very large.

Alternatively, a nonlinearity may be introduced into the equation of oscillation, e.g., in that a temperature-dependent resistor which varies in dependence on current (and temperature) is connected in series with the inductor or in that a capacitor is used which has a capacitance which depends on the current flowing through the capacitor, e.g., because the dielectric of the capacitor has certain special properties.

The invention permits the provision of a truly parametric generator which differs from the usual frequency-sensitive a.c. generators in that it delivers a sinusoidal alternating current which is stable in frequency and amplitude even if the resistance, inductance and capacitance of the consumers connected to the generator are subject to strong stochastic changes.

The invention permits also the provision of a parametric motor which can be supplied from a normal a.c. power supply system, is of lightweight structure and (in dependence on the selected parameters) may be operated at high speeds and apply high voltages (in the kilovolt range) to the motor.

DETAILED DESCRIPTION OF THE DRAWINGS

An illustrative embodiment of the invention will now be described more fully with reference to the drawings.

DESCRIPTION OF PREFERRED EMBODIMENTS

Figure 1:
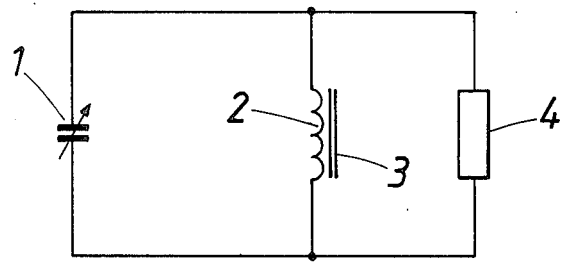
FIG. 1 is a circuit diagram showing a parametric generator according to the invention.

In accordance with FIG. 1, the parametric generator consists of a capacitor 1, which has a periodically variable capacitance, and an induction coil 2, which has a core 3 of ferromagnetic material. A consumer 4 is connected in parallel to the induction coil 2.

Figure 2:
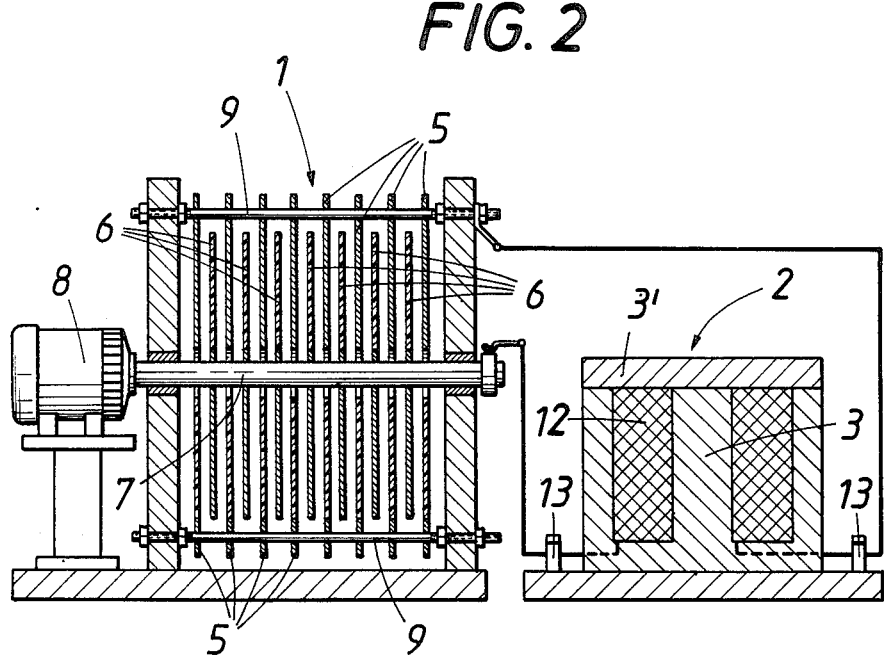
FIG. 2 is a sectional view showing an illustrative embodiment of a capacitor having a capacitance which varies with time and an induction coil which is connected in series with that capacitor and has an iron core.
Figure 3:
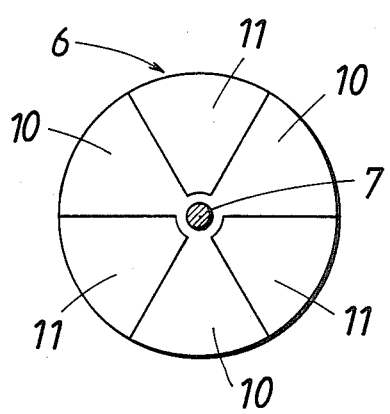
FIG. 3 is an elevation showing a rotor plate.
Figure 4:
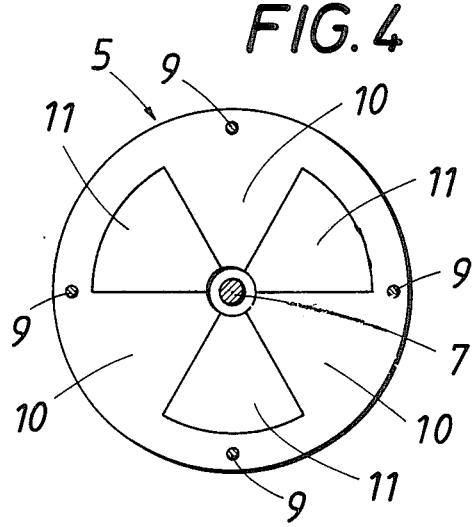
FIG. 4 shows a stator plate of the capacitor of FIG. 2.

As is apparent from FIG. 2, the capacitor 1 comprises stator plates 5 and rotor plates 6. The rotor plates 6 are carried by and electrically conductively connected to the shaft 7, which is driven by a symbolically represented mechanical drive 8 consisting, e.g., of a motor or a turbine. The stator plates 5 are held by electrically conducting rods 9. The stator plates 5 and the rotor plates 6 have substantially the same structure and as shown in FIG. 3 for the rotor plate and in FIG. 4 for the stator plate consist of alternating sectors 10 of electrically conducting material, such as copper, and sectors 11 of electrically insulating material, such as plastic material. As the rotor plates 6 rotate, the capacitance C of the capacitor varies periodically as a function of time.

The induction coil 2, which is connected in series with the capacitor 1, consists of the coil winding 12 and the iron core 3, which in the present case is an E-I core composed of commercial core sheets having a thickness of 0.35 mm and a core loss ($V_{10}$) of 1.3 W/kg. The consumer, not shown, is connected to the terminals 13 of the induction coil 2.

Because the periodicity of the capacitance of the capacitor 1 must correspond to the frequency of the resonant circuit in accordance with the "condition of resonance", the parametric generator desirably permits an adjustment in this respect. The period of the change of the capacitance of the capacitor 1 as a function of time depends on the speed of the motor or turbine and in the illustrative embodiment shown on the number of sectors 10, 11 of the rotor plates 6 and stator plates 5. To meet the conditions of resonance, the speed of the drive 8 may be varied, e.g., by means of an infinitely variable transmission. Alternatively, the electromagnetic parameters of the resonant circuit may be adjustable. For instance, the inductance of the induction coil 2 may be varied by an adjustment of the air gap between the yoke (I section) 3' and the E section of the iron core 3 or the total capacitance may be changed by means of a small additional variable capacitor connected in series.

In a parametric generator according to the invention in which $L_o = 80$ H, $C_o = 2.13 \times 10^{-9}$ F, $\Delta C = 0.22$, $R_o = 10$ kiloohms and which comprises an iron core consisting of core sheets IV having a thickness of 0.35 mm and core losses ($V_{10}$) of 1.3 W/kg, a stable alternating current voltage of 1050 volts at a frequency of 300 Hz has been obtained. For lower frequencies and higher voltages, the speed of the capacitor and/or the parameters $L_o$, $C_o$, $\Delta C$ must be varied accordingly.

Figure 5:
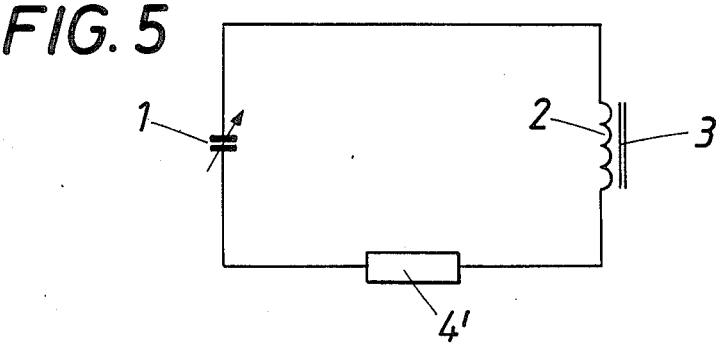
FIGS. 5 and 6 are additional circuit diagrams of the parametric generator according to the invention.
Figure 6:
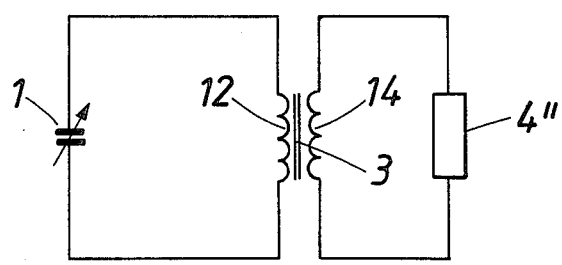

In accordance with the circuit diagram shown in FIG. 1, the consumer 4 is connected in parallel to the induction coil 2. Alternatively, as is shown in FIG. 5, the consumer 4' may be connected in series with the capacitor 1 and the induction coil 2. In practice it will be most desirable, as is shown in FIG. 6, to connect the consumer 4" by a transformer to the resonant circuit of the parametric generator by a transformer in such a manner that the coil winding 12 of the inductor of the resonant circuit constitutes the primary winding of the transformer and the iron core 3 of the inductor of the resonant circuit is designed to magnetically couple the primary winding 12 and the secondary winding 14. It is not necessary that the primary winding of the transformer is constituted by the entire coil winding 12 of the inductance of the resonant circuit. For instance, if the inductor of the resonant circuit consists of a plurality of induction coils, the primary winding of the transformer may be constituted by only part of the induction coils.

The periodically variable capacitance may be provided by means other than those used in the embodiment described by way of example. For instance, the dielectric of the capacitor may consist of a gear, which is rotated between the capacitor plates by a motor, a hydraulic turbine or the like. Alternatively, a cylindrical capacitor may be used, which consists of two cylinders, which extend coaxially one in the other and are rotatable relative to each other and each of which consists of alternating sections of conducting and dielectric materials.

In accordance with general laws of thermodynamics, the generator shown in the drawings may be used as a motor if an a.c. voltage is applied to the terminals 13 in FIG. 2 and an initial torque is imparted to the rotor plates 6 of the capacitor 1 or to the capacitor shaft 7 so that the "condition of resonance" is met. In that case, the sectors 10 will be positively and negatively charged and electrostatic repelling forces and torques will be generated.

I claim:

1. A parametric electric machine comprising a series resonant circuit which has a resistor element having a resistance, an induction coil element having an inductance and a capacitor element having a capacitance and means periodically alternating the capacitance, (a) the resonant circuit fulfilling the condition $$\frac{\Delta C}{C_o} \cong 2 R_o \sqrt{\frac{C_o}{L_o}}$$

wherein $C_o$ is the total capacitance of the capacitor element, $\Delta C$ is the mechanically effected change of the capacitance of the capacitor element, $R_o$ is the resistance of the induction coil element and of any additional strict resistance under no load, and $L_o$ is the inductance of the induction coil element, and (b) at least one of the elements is a non-linear element having an impedance dependent on the current flowing in the resonant circuit whereby the fluctuation of voltage appearing according to the transformation of mechanical work into electrical energy at the capacitor element is transformed into sinusoidal alternating voltage.

2. The parametric machine according to claim 1, wherein the induction coil element comprises at least one induction coil including a stationary core consisting of ferromagnetic material.

3. A parametric machine according to claim 2, wherein the core of the induction coil consists of low-loss ferromagnetic material.

4. A parametric machine according to claim 3, wherein the core has a core loss ($V_{10}$) of about 1 to 3 W/kg.

5. A parametric machine according to claim 2, wherein the core consists of a laminated core of dynamo sheets IV having a thickness of 0.35 mm.

6. The parametric machine according to claim 1, wherein the capacitor element comprises at least one capacitor consisting of discs rotatable relative to each other on an axis and extending normal to said axis, each disc having alternating sectors of conducting and dielectrical materials.

7. A parametric machine according to claim 1, wherein a transformer having a primary winding connects a consumer to the resonant circuit, the induction coil forming at least a part of the primary winding.

* * * * *